US009521549B2

(12) United States Patent
Lundstrom

(10) Patent No.: US 9,521,549 B2
(45) Date of Patent: Dec. 13, 2016

(54) WIFI FIXED WIRELESS PERSONAL SERVICES

(75) Inventor: Anders Lundstrom, Sollentuna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 136 days.

(21) Appl. No.: 14/130,266

(22) PCT Filed: May 25, 2012

(86) PCT No.: PCT/EP2012/059913
§ 371 (c)(1),
(2), (4) Date: Dec. 30, 2013

(87) PCT Pub. No.: WO2013/000645
PCT Pub. Date: Jan. 3, 2013

(65) Prior Publication Data
US 2014/0148129 A1    May 29, 2014

Related U.S. Application Data

(60) Provisional application No. 61/503,214, filed on Jun. 30, 2011.

(51) Int. Cl.
*H04W 12/06* (2009.01)
*H04W 88/16* (2009.01)
*H04W 8/26* (2009.01)
H04L 29/06 (2006.01)

(52) U.S. Cl.
CPC ............... *H04W 12/06* (2013.01); *H04W 8/26* (2013.01); *H04W 88/16* (2013.01); *H04L 63/0892* (2013.01)

(58) Field of Classification Search
None
See application file for complete search history.

(56) References Cited

U.S. PATENT DOCUMENTS

| 8,391,218 | B1* | 3/2013 | Joshi et al. | 370/329 |
| 2006/0098614 | A1* | 5/2006 | Moon | H04W 12/06 370/338 |

(Continued)

FOREIGN PATENT DOCUMENTS

| EP | 1990951 | 11/2008 |
| WO | WO-2009/132435 | 10/2010 |

OTHER PUBLICATIONS

PCT Notification of Transmittal of the International Search Report and the Written Opinion of the International Searching Authority for PCT Counterpart Application No. PCT/EP2012/059913, (Aug. 17, 2012), 13 pages.

(Continued)

*Primary Examiner* — Lester Kincaid
*Assistant Examiner* — Daniel G Bassett
(74) *Attorney, Agent, or Firm* — Nicholson De Vos Webster & Elliot, LLP

(57) ABSTRACT

A method of providing access for wireless terminals to a packet core network. The method comprises attaching an access point to said packet core network via a cellular radio access network, defining a subnet associated with an Internet Protocol (IP) address space, and configuring said access point as a router of the subnet. Then, for each wireless terminal that requires access to said packet core network via said access point, the following operations are performed: a) authenticating and authorizing the wireless terminal to the packet core network via the access point, and b) exchanging signaling between the wireless terminal and the packet core network via the access point in order to allocate to the wireless terminal an IP address from said IP address space.

18 Claims, 10 Drawing Sheets

(56) References Cited

U.S. PATENT DOCUMENTS

| | | | |
|---|---|---|---|
| 2006/0233128 A1 | 10/2006 | Sood et al. | |
| 2009/0175221 A1* | 7/2009 | Visuri et al. | 370/328 |
| 2011/0078764 A1* | 3/2011 | Bichot | 726/3 |
| 2012/0012082 A1 | 5/2012 | Anderson et al. | |
| 2012/0120828 A1 | 5/2012 | Anderson et al. | |
| 2012/0120843 A1* | 5/2012 | Anderson et al. | 370/253 |
| 2012/0120913 A1* | 5/2012 | Wirtanen et al. | 370/331 |
| 2012/0269162 A1* | 10/2012 | Vesterinen | H04W 12/06 370/331 |
| 2014/0013392 A1* | 1/2014 | Vikberg et al. | 726/3 |

OTHER PUBLICATIONS

"Architecture enhancements for non-3GPP accesses," 3GPP TS 23.402, V10.3.0, Release 10, http://www.3gpp.org/ftp/specs/html-info/23402.htm, (Mar. 2011), 229 pages.

3GPP TS 23.401 V9.8.0, "General Packet Radio Service (GPRS) enhancements for Evolved Universal Terrestrial Radio Access Network (E-UTRAN) access," ETSI TS 123 401 V9.8.0, LTE, Mar. 2011, 262 pages.

3GPP TS 23.402 V9.8.0, "Architecture enhancements for non-3GPP accesses," ETSI TS 123 402 V9.8.0, Universal Mobile Telecommunications System (UMTS), LTE, Mar. 2011, 202 pages.

3GPP TS 23.402 V10.4.0, "Architecture enhancements for non-3GPP accesses," 3rd Generation Partnership Project, Technical Specification Group Services and System Aspects, Jun. 2011, 231 pages.

Wi-Fi Alliance, Hotspot Technical Specification (Release 1) Version 1.0.0, Wi-Fi Alliance Wi-Fi Certified Passpoint program, May 7, 2012, 25 pages.

PCT International Preliminary Report on Patentability (Chaper I) for PCT Counterpart Application No. PCT/EP2012/059913, (Jan. 7, 2014), 7 pages.

* cited by examiner

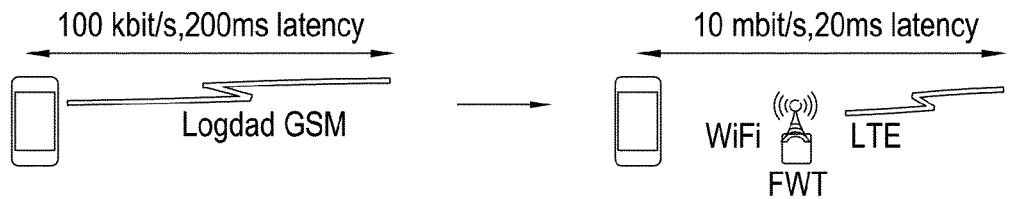

Fig. 10

```
S1. Power up access point (FWT) and attach to packet core network via cellular RAN
                              ↓
S2. Define a subnet associated with an IP address space,
    and configure access point as a router for that subnet
                              ↓
S3. Wireless terminal initiates packet core network connection
                              ↓
S4. Authenticate and authorise wireless terminal to packet core network, via
    the access point, e.g. using EAP-SIM/AKA or other EAP-based protocol
                              ↓
S5. Signalling exchange between wireless terminal and packet core
    network to allocate IP address, for IP address space, to wireless terminal
                              ↓
S6. Install uplink filters in FWT for wireless terminal
```

Fig. 11

WIFI FIXED WIRELESS PERSONAL SERVICES

CROSS-REFERENCE TO RELATED APPLICATIONS

This application is a National stage of International Application No. PCT/EP2012/059913, filed May 25, 2012, which claims priority to U.S. Application No. 61/503,214, filed Jun. 30, 2011, which are hereby incorporated by reference.

TECHNICAL FIELD

The present invention relates to WiFi fixed wireless personal services. More particularly, it relates to the use of Fixed Wireless Terminals or other types of WiFi access points using 3GPP as "last mile" access technology to interconnect mobile user devices to the core network of a cellular network operator.

BACKGROUND

A "Fixed Wireless Terminal" (FWT) is a device that can communicate wirelessly with the Radio Access Network of a cellular network operator in much the same way as a standard mobile device, e.g. a cellular telephone, smartphone, USB dongle and the like. It uses standard authentication mechanisms to connect to the cellular network, e.g. using a Universal Integrated Circuit Card (UICC) or Subscriber Identity Module (SIM) card. The FWT is fixed in the sense that it is not intended to be carried around by a person. In practice, its mobility may be constrained by the need for access to a power supply, and/or by its intended purpose. However, whilst a FWT may be fixed to a building (inside or out), it may also be located, for example, on a vehicle (bus, car) or train. The FWT provides an access point (to the cellular network) for user devices. The FWT will typically use WiFi to communicate wirelessly with these user devices.

In regions with limited copper (wire) availability for telecommunication services, the FWT offers an efficient and relatively low cost solution to the problem, providing a communications "hotspot". As long as users are within range of a FWT they are able to access telecommunication services. Another interesting possibility afforded by FWTs is the connection of legacy (GSM and 3G) terminals to high capacity Long Term Evolution (LTE) and High Speed Packet Access (HSPA) networks. In many regions it will take a considerable time for consumers to acquire LTE or HSPA enabled terminals, and the FWT will allow cellular network operators to take advantage of the backhaul capability and flexibility of LTE and HSPA infrastructure in the meantime. In such a scenario, the FWT provides an interface between the WiFi access and the LTE or HSPA access network. This is illustrated schematically in FIG. 1.

The 3GPP specification 23.402 and WiFi Alliance Hotspot 2.0 are concerned with fixed broadband connectivity to a WiFi access point. Access control and roaming in a WiFi access environment tends to be built around Wireless Internet Service Provider roaming (WiSPr) and emerging technologies using Extensible Authentication Protocol (EAP) Subscriber Identity Module (SIM)/Authentication and Key Agreement (AKA) authentication. Unless new functionality is introduced, these solutions will be inefficient for FWTs having mobile access broadband connectivity. Individual users behind the FWT are not seen by the mobile access network as they are hidden behind a NAT inside the FWT. Possible alternative solutions involve web login procedures and/or tunneling between the user devices and some central (e.g. Virtual Private Network (VPN)) server. However, such solutions are likely to be complex to implement and will not integrate well with existing mobile network architectures and policy control (e.g. for charging and Quality of Service (QoS) purposes).

SUMMARY

It is an object of the present invention provide an efficient solution to the problem of allowing wireless terminals to access a packet core network, of a cellular network operator, via an access point such as a Fixed Wireless Terminal.

According to a first aspect of the present invention there is provided a method of providing access for wireless terminals to a packet core network. The method comprises attaching an access point to said packet core network via a cellular radio access network, defining a subnet associated with an IP Internet Protocol (IP) address space, and configuring said access point as a router of the subnet. Then, for each wireless terminal wishing to access said packet core network via said access point, the following operations are performed:

a) authenticating and authorising the wireless terminal to the packet core network via the access point, and
b) exchanging signalling between the wireless terminal and the packet core network via the access point in order to allocate to the wireless terminal an IP address from said IP address space.

By configuring the access point as an IP router, whilst at the same time allocating IP addresses to wireless terminals from within the core network, increased control and flexibility are provided to the network operator when it comes to the provision of packet access services.

The wireless terminals are typically WiFi enabled, with said access point providing a WiFi hotspot towards the wireless terminals. The access point may further operate as a fixed wireless terminal, or a mobile wireless terminal, e.g. 3G or LTE, towards said cellular radio access.

Step a) may involve one of SIM/AKA and EAP. For example, authentication of the wireless terminal may involve a 802.1x exchange between the wireless terminal and the access point, and radius/EAP exchange between the access point and the packet core network. Step b) may result in policy rules being installed in a GGSN/PGW within the packet core network, the policies relating to the allocated IP address.

According to a second aspect of the present invention there is provided an access point for enabling wireless terminals to access a packet core network. The access point comprises a cellular radio controller for attaching to a packet core network via a cellular radio access network, and an IP router configured to operate as a router for a subnet associated with an IP address space. The access point further comprises a local radio controller configured to provide a wireless hotspot for wireless terminals within a local coverage area, and a signalling relay for relaying authentication signalling between a wireless terminal and the packet core network, and for relaying further signalling between the wireless terminal and the packet core network in order to allocate to the wireless terminal an IP address from said IP address space.

The access point may be a Fixed Wireless Terminal providing a WiFi service to local wireless terminals, and with the backhaul being provided by a High Speed Packet Access, HSPA, over 3G, or Long Term Evolution, LTE, cellular radio access network.

According to a third aspect of the present invention there is provided an Authentication, Authorization, and Accounting, AAA, server for use within a packet core network. The server comprises a first controller for authenticating and authorizing, via a cellular radio access network, an access point that is configured to operate as a wireless hotspot for wireless terminals, and a notifier for notifying a Dynamic Host Control Protocol, DHCP, server of the authentication and authorization of the access point and for installing in the DHCP server an IP address space of a subnet for which the access point is to act as router. The server further comprises a second controller for authenticating and authorizing, via the access point, individual wireless terminals.

The second controller of the AAA server may be configured to signal to a policy controller to initiate installation of uplink filters in the access point in respect of the authenticated and authorised wireless terminals.

BRIEF DESCRIPTION OF THE DRAWINGS

FIG. 10 illustrates bandwidth and latency rates available via a loaded GSM access network and via a FWT with an LTE backhaul network;

FIG. 11 is a flow diagram illustrating a process for allowing wireless terminals to connect to a packet core network via a fixed wireless terminal;

DETAILED DESCRIPTION

Figure 1:
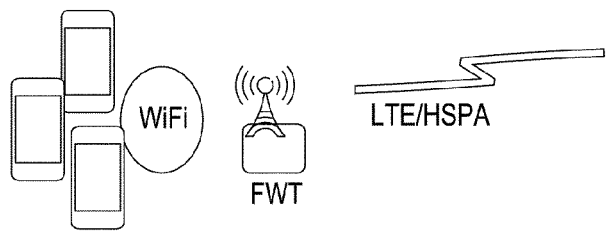
FIG. 1 illustrates schematically a user device access architecture involving a Fixed Wireless Terminal with mobile network broadband delivery.

As has been discussed above, there are many advantages, both to end users and to network operators, to introducing Fixed Wireless Terminals (FWTs) having mobile network broadband delivery (e.g. HSPA or LTE). However, building subscriber awareness behind these operator managed FWTs (FIG. 1) is important. A number of solutions are presented here. These are, as far as possible, compatible with existing user devices supporting EAP-SIM/AKA or other EAP methods for authentication, as well as with the key components from the ongoing work within WiFi Alliance Hotspot 2.0 working group using 802.1x and EAP methods.

Figure 2:
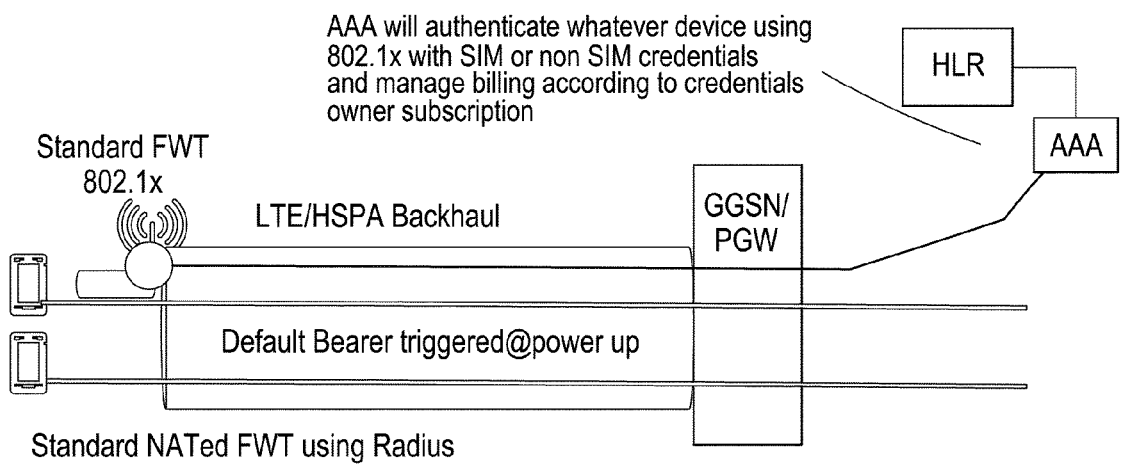
FIG. 2 illustrates schematically a first use case providing a relatively simple mechanism for connecting user terminals to a packet core network via an LTE or HSPA backhaul network.

FIG. 2 illustrates schematically a relatively simple solution (use "case 1") using NAT within the FWT, and adding authentication. [It should be understood that, for the purpose of illustration, certain network nodes and functions are illustrated that are standard specific. However, equivalents of these nodes will be readily apparent, and it will be understood that these nodes and functions may evolve and change over time.] Shown in the Figure are a (standard) FWT implementing the IEEE 802.1 x WiFi interface, a LTE/HSPA backhaul network (details of this network are omitted for simplicity), a GGSN/PGW present within the mobile network operator's packet switched (PS) core network, an Authentication, Authorization and Accounting (AAA) server, and a Home Location Register (HLR).

Upon power up of the FWT, a default packet bearer is established between the FWT and the GGSN/PGW. Thereafter, EAP-SIM/AKA or other EAP methods for non-SIM based devices can be used with the FWT as authenticator for the devices behind the FWT. [This is handled by the wireless manager in these devices.] This solution shares the full bandwidth, with common Quality of Service (QoS), amongst all users behind the FWT, as well as class-based QoS where different FWTs can get different QoS classes. In this solution, different users within the same FWT cannot be given different QoS Class Indicators, QCIs, to allow differentiated packet handling). However, bandwidth management is for the hotspot as a whole and is not possible per subscriber. This approach also only allows for a relatively simple charging model, e.g. using Radius accounting (for time and volume based charging) based on start and stop of WiFi use for a given user. Nonetheless, the solution can scale to allow hundreds of devices to be connected to a given FWT.

Figure 3:
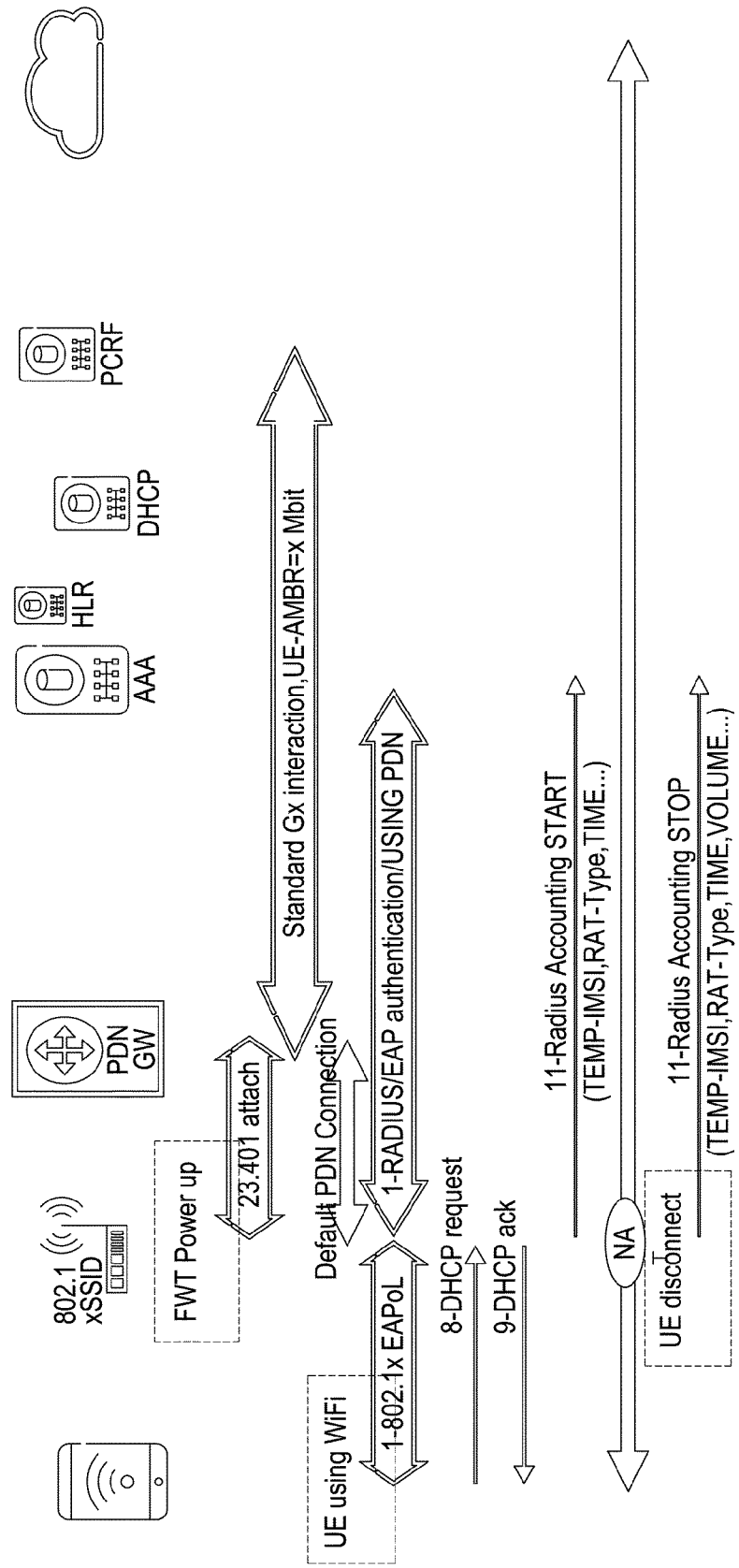
FIG. 3 illustrates a signalling flow according to the use case of FIG. 2.

Use case 1 is further illustrated in FIG. 3. The standard attach procedure is employed at power up of the FWT in order to connect the FWT to the mobile network and to establish a default Packet Data Network (PDN) connection between the FWT and the PGW (identified in this and further figures as "PDNGW"). Once this is done, 802.1x with EAP-SIM/AKA or other EAP methods is used to authenticate the WiFi device behind the FWT (piggybacking on the bearer associated with the default PDN connection). The DHCP process, used to provide an IP address to the device, is illustrated in a simplified manner with DHCP Discover omitted. All wireless devices behind the FWT send and receive IP packets via the default bearer.

Figure 4:
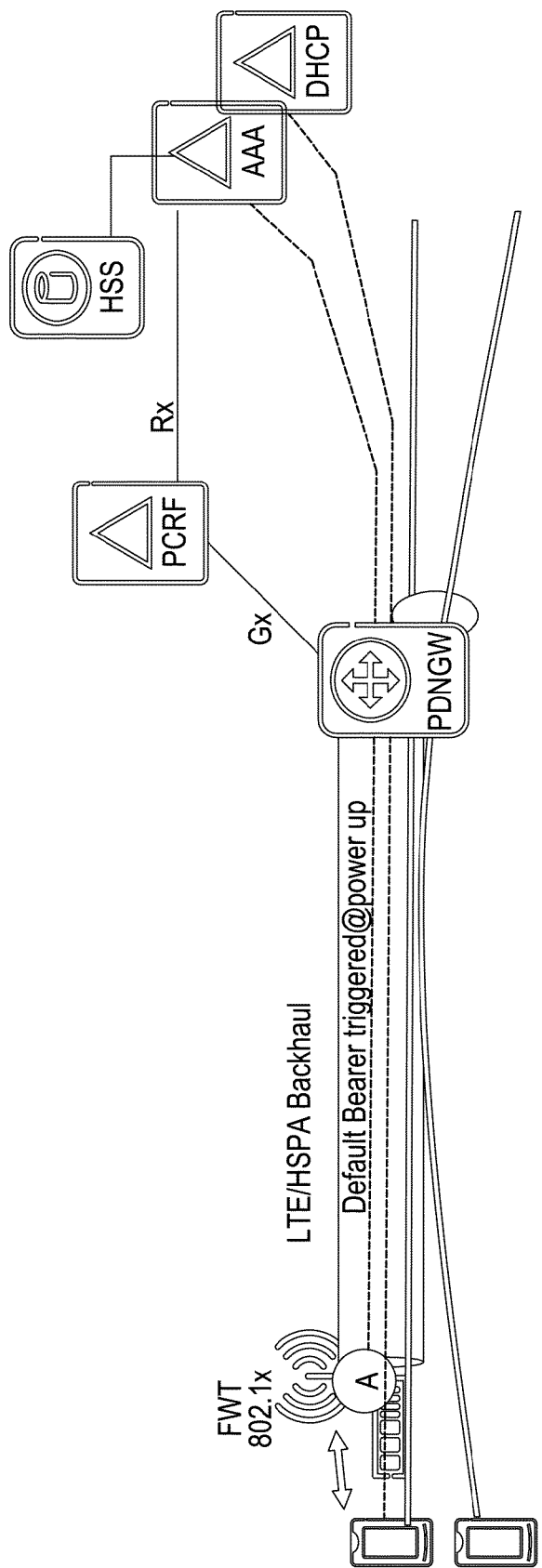
FIG. 4 illustrates schematically a second use case providing a mechanism for connecting user terminals to a packet core network via an LTE or HSPA backhaul network.

A second use case 2 is illustrated schematically in FIG. 4. This approach again employs a single bearer (i.e. that associated with the default PDN connection) to carry end user traffic, but without NATing at the FWT. This solution shares the full bandwidth between all WiFi devices, with common end-to-end (e2e) QoS. Charging rules/flow based charging and bandwidth management can be enforced in the GGSN/PGW on a per user basis. This solution can again scale to allow hundreds of devices to be connected to the FWT.

Figure 5:
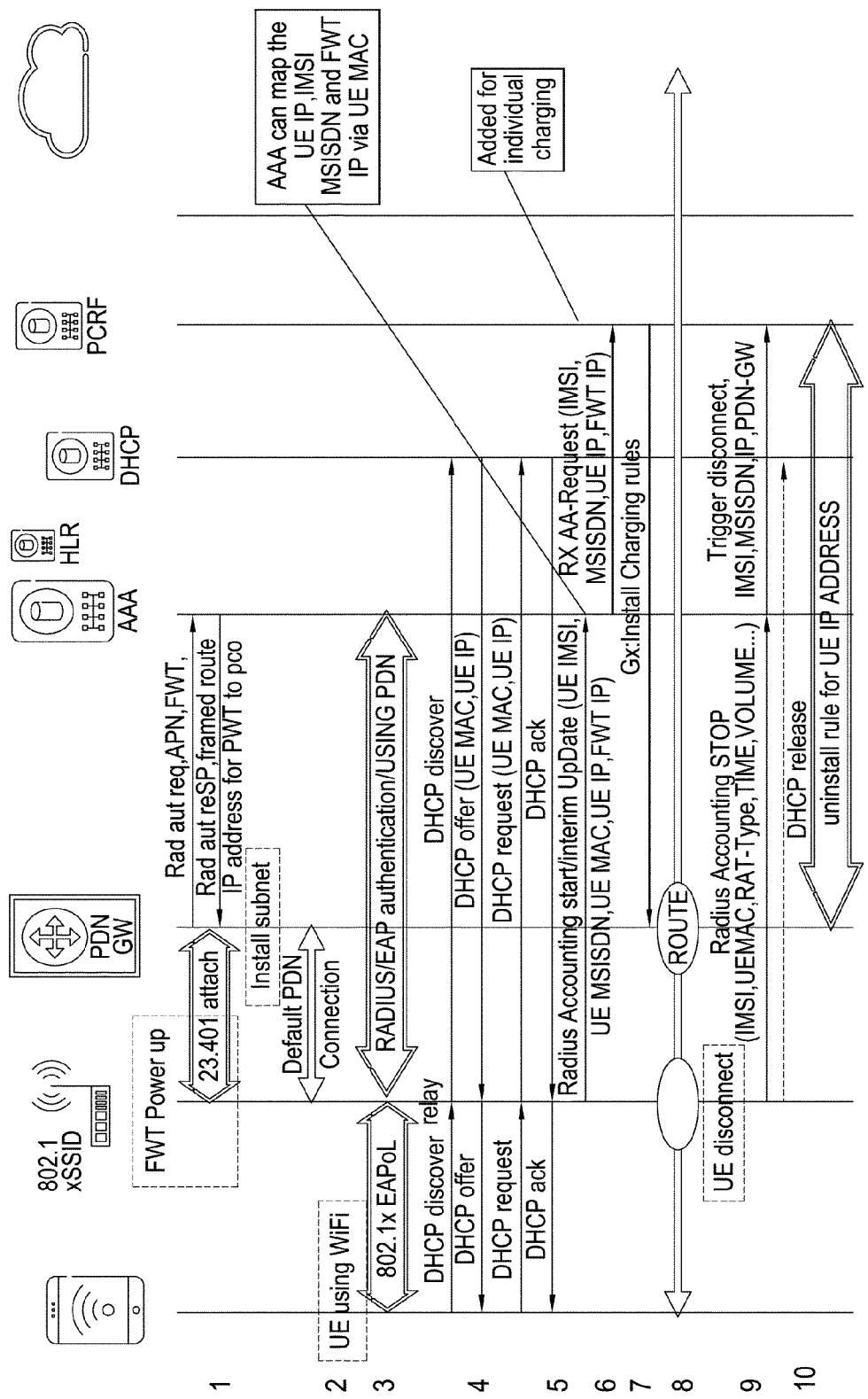
FIG. 5 illustrates a signalling flow according to the use case of FIG. 4.

Use case 2 is further illustrated in FIG. 5. The PGW is configured, upon power up of the FWT, to assign a subnet (i.e. IP address range) to the FWT. The FWT is configured to operate as a router. Once this is done, 802.1x with EAP-SIM/AKA or other EAP method is used to authenticate the WiFi device behind the FWT. The FWT uses DHCP relay to forward the DHCP request and enable the operator network to bind the DHCP session to the authenticated WiFi user. When the DHCP server has assigned a UE IP address, the FWT sends a Radius accounting message to the AAA server. The AAA server converts the accounting message to an Rx message and sends this to the PCRF.

An advantage of allowing the network to assign the IP address is that there is no requirement to provision the FWT on a per UE basis. On the other hand, the network servers have to be configured with the correct IP Subnet to be used.

The Gx interface is used to provision QoS and Charging rules, for a specific WiFi UE, in the GGSN or PGW which acts as a Policy Charging Enforcement Function (PCEF) according to the PCC architecture. These rules are installed by a Policy and Charging Rules Function (PCRF). In particular, the PCRF will map the UE IP address to a Gx session for the FWT. The PCRF will install a charging rule in the GGSN/PGW with AF-Charging-Identifier set to IMSI and/or MSISDN and with a FWT unique rating group per UE.

For offline charging, the FWT will generate accounting messages with separate containers per hotspot user (per rating group) that include volume together with user identity (AF-Charging-Identifier). For online charging, the Gy session for that FWT will generate one individual credit-instance (quota) per hotspot user (rating group), where each individual quota request will contain the WLAN user identity (AF-Charging-Identifier). For both the online and offline cases, a mediation-device might be required in order to convert the CDRs/Gy messages to a format that the charging system understands.

Returning to the signaling flow of FIG. 5, Radius accounting or DHCP release is used to trigger the close of charging records and release the IP address assigned to the UE.

Figure 6:
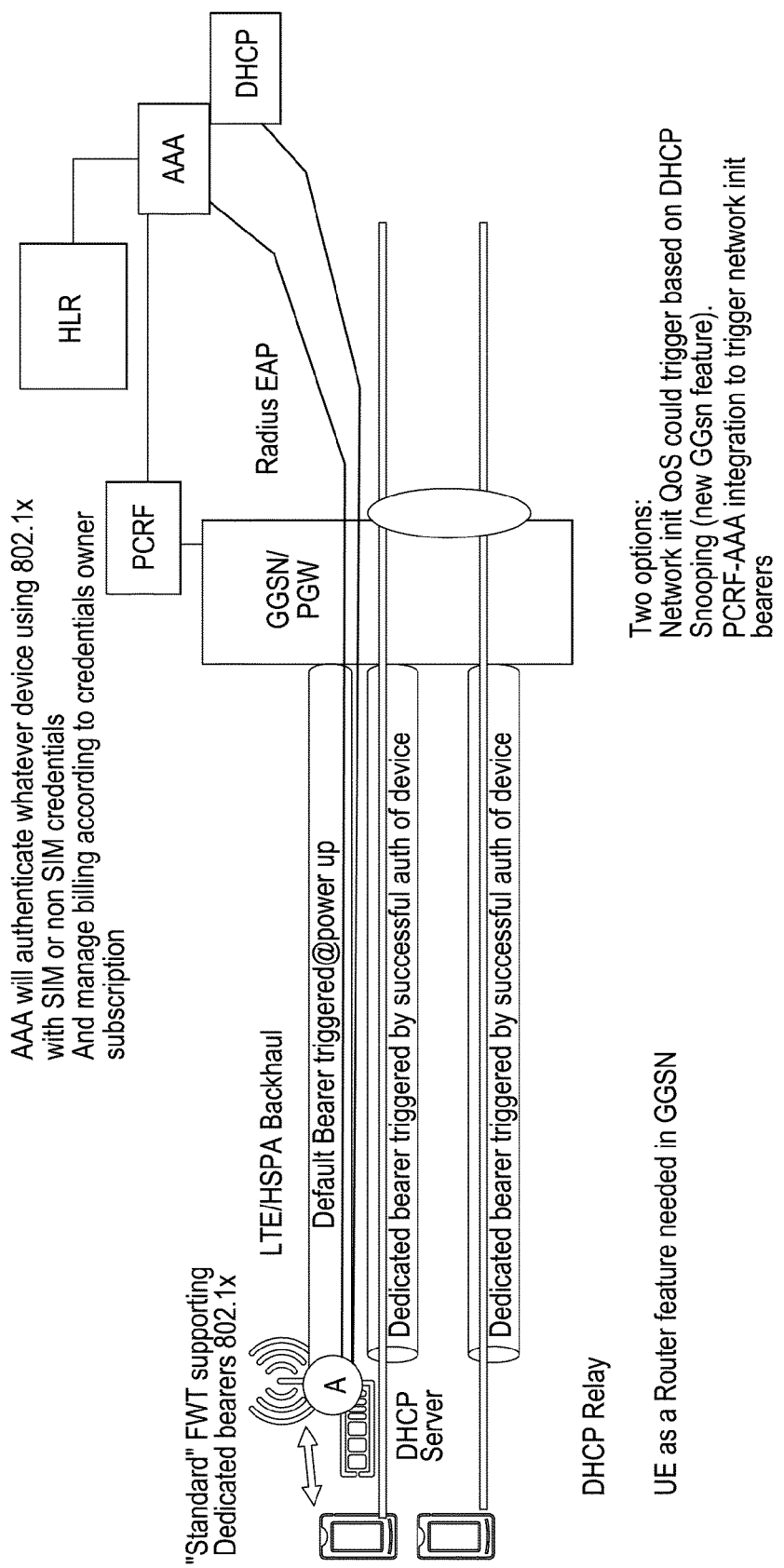
FIG. 6 illustrates schematically a third use case providing a mechanism for connecting user terminals to a packet core network via an LTE or HSPA backhaul network.

A more sophisticated solution, referred to here as use case 3, is illustrated schematically in FIG. 6. This solution provides for additional bearers that can be used to separate WiFi users on different Evolved Packet System (EPS) bearers, allowing different users to have different QoS. Dedicated bearers might be triggered, for example, by a network initiated QoS procedure triggered by DHCP Snooping, packet inspection or Policy control triggered by the DHCP authentication phase. However, use case 3 is limited insofar as a maximum of eight bearers can be established towards the FWT, potentially limiting its use to only eight UEs. Multiplexing several users (with the same QoS class) on the same bearer may be used to increase this capacity. An uplink QoS filter can be implemented using either Protocol Configuration Options (PCO) extensions or smart usage of the Traffic Flow Templates (TFTs), or using off path communication between the DHCP/AAA server and the UE to provision uplink filters, in the FWT, for a specific IP address.

Figure 7:
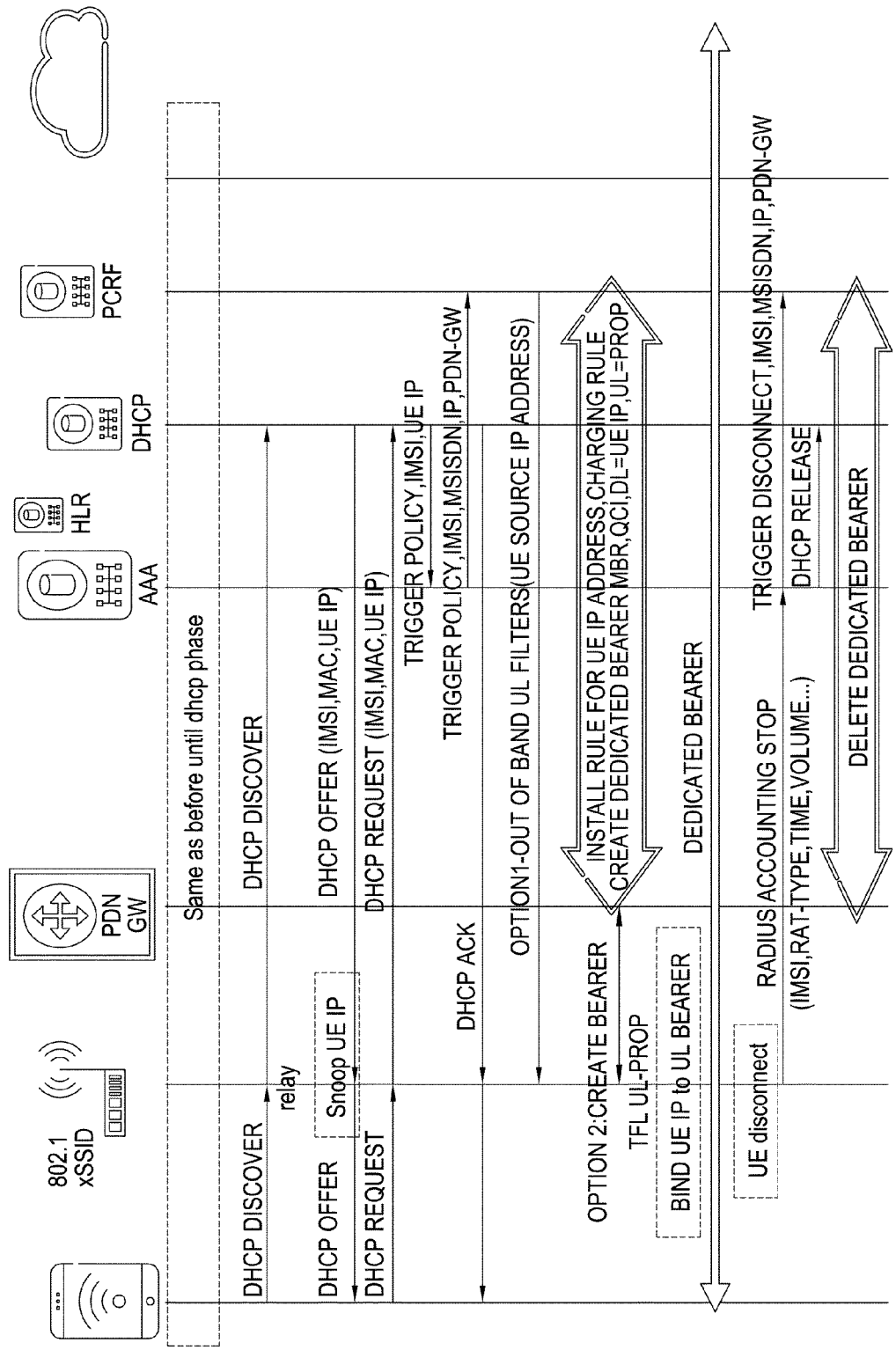
FIG. 7 illustrates a signalling flow according to the use case of FIG. 6.

Use case 3 is further illustrated in FIG. 7. The call flow utilizes the same steps as use case 2, up to the UE initiated DHCP phase, and including establishment of the default PDP connection. Standard DHCP is used from each WiFi UE. The DHCP phase triggers the setup of a dedicated EPS bearer for a WiFi enabled UE. Uplink filters can be installed in the FWT, for example, in two different ways, namely:

Option 1. Out of band autoprovisioning of uplink policies at the WiFi UE from a backend server, for instance piggybacked on Radius Authentication for a subscriber. This would contain a UE IP address to be mapped towards a dedicated bearer in the FWT.

Option 2. Use of proprietary extensions or interpretation of the options signalled to the UE as part of the dedicated bearers setup. This approach may be less desirable however as it would likely require changes to lower level network architecture signaling.

Once the dedicated bearer has been set up between the core network and the FWT, and the uplink filters have been installed in the FWT, the FWT will bind the UE IP address to the dedicated bearer. Again, Radius accounting or DHCP release is used to trigger the close of charging records and release the IP address assigned to the UE.

Figure 8:
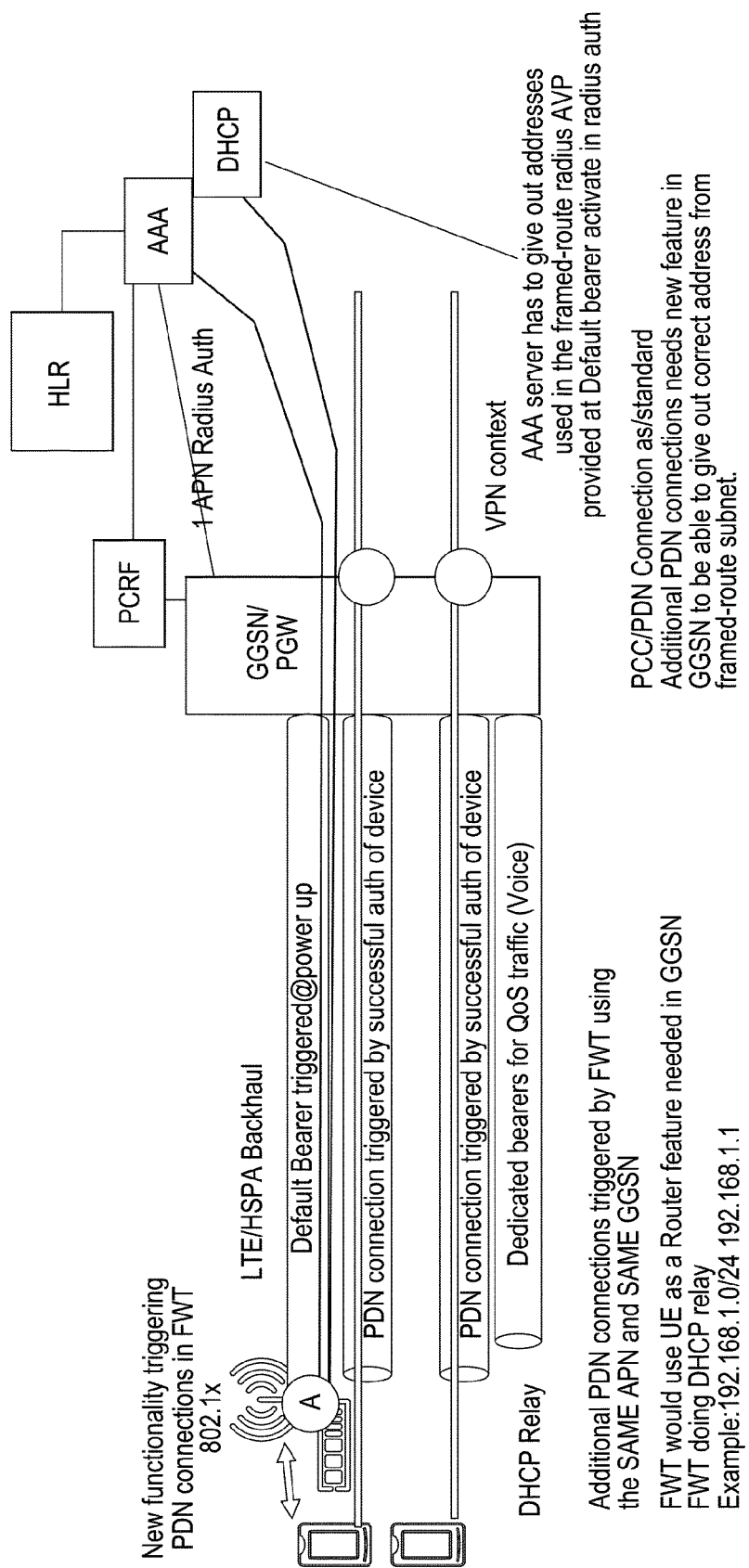
FIG. 8 illustrates schematically a fourth use case providing a mechanism for connecting user terminals to a packet core network via an LTE or HSPA backhaul network.

FIG. 8 illustrates a use case 4 which is able to provide full Policy and Charging Control (PCC) on a per subscriber basis, by allocating a PDN Connection per UE with one or more dedicated bearers associated with it. This use case does limit scalability in terms of number of users, making it more suitable to high QoS demanding services and not widely available hotspot services.

Figure 9:
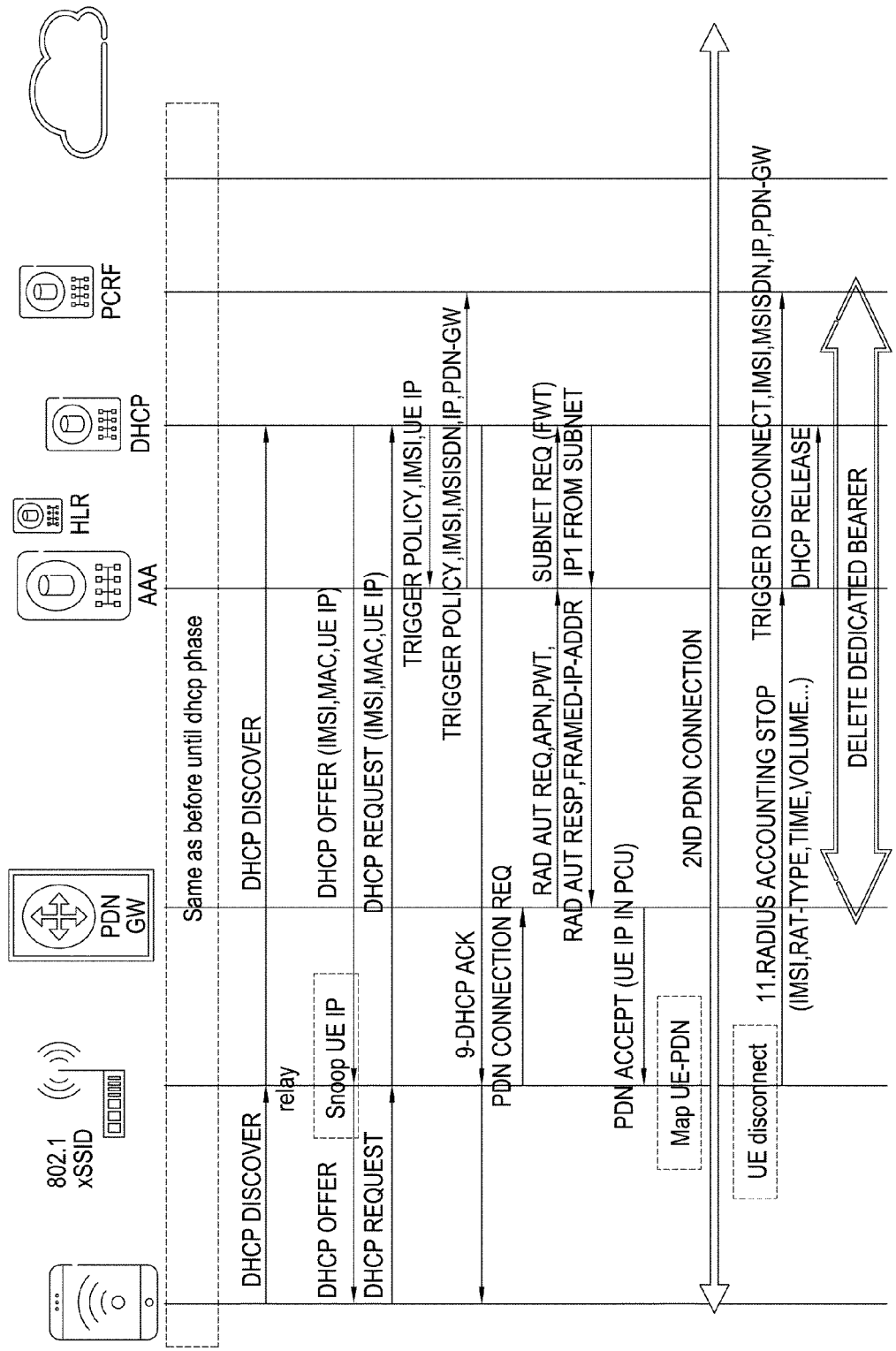
FIG. 9 illustrates a signalling flow according to the use case of FIG. 8.

Use case 4 is further illustrated in FIG. 9. Again, the call flow utilizes the same steps as use case 2, up to the UE initiated DHCP phase, and including establishment of the default PDP connection (with associated default bearer). Standard DHCP is used from each WiFi UE. The FWT "snoops" the DHCP ACK and uses this event to trigger a further PDN connection setup with the PGW. This approach will provide the UE with a unique IP address used for the default bearer as part of the PDN Connection setup. A UE may establish additional bearers associated with its dedicated PDN connection (not shown in FIG. 9). For the disconnect procedure, the FWT or network could trigger PDN disconnect and release the associated WiFi UE resources.

The use cases presented above, involving as they do authentication of SIM-based devices in an automatic fashion, allow users with GSM+WiFi terminals to utilize the latest HSPA/LTE enhancements without changing terminals. The terminals are not limited by the bandwidth available via the GSM technology. The use cases enable operators to benefit quickly from their investments in LTE and HSPA infrastructure. This is illustrated in FIG. 10 which contrasts the bandwidth and latency rates available with these use cases, with that available via the conventional GSM architecture.

FIG. 11 is a flow diagram illustrating various operations in a procedure for attaching a wireless terminal (UE) to a packet core network via a FWT. At block S1, the FWT is powered up and is attached to the packet core network, via the cellular Radio Access Network (RAN), using standard attachment procedures. At block S2, the core network defines a subnet, associated with an IP address space, and configures the FWT (access point) as a router for that subnet. Then, at block S3, a wireless terminal initiates a packet core network connection. Authentication and authorization signaling is exchanged between the wireless terminal and the core network, via the FWT, S4, to authenticate and authorize the terminal. At block S5, the wireless terminal then exchanges signaling with the core network in order to allocate an IP address, from the subnet range, to the wireless terminal. At block S6, uplink packet filters are installed, by the core network, into the FWT, in respect of the wireless terminal. The terminal can then begin to send and receive packet data via the FWT.

Figure 12:
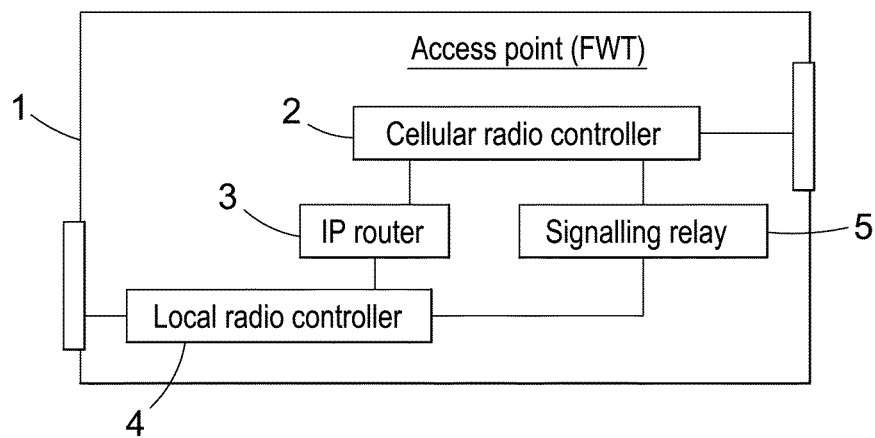
FIG. 12 illustrates schematically a Fixed Wireless Terminal suitable for use with the process of FIG. 11.

Referring now to FIG. 12, this illustrates schematically an access point (FWT) 1 suitable for use with the access procedure discussed above. A cellular radio controller 2 is provided for enabling the FWT to attach to a packet core network via a cellular radio access network. Coupled to the cellular radio controller 2 is an IP router 3, configured to operate as a router for a subnet associated with an IP address space. Coupled in turn to the IP router 3 is a local radio controller 4 configured to provide a wireless hotspot for wireless terminals within a local coverage area. Coupled between the cellular radio controller 2 and the local radio controller 4 is a signalling relay 5. This signalling relay 5 relays authentication signalling between a wireless terminal and the packet core network, as well as relaying further signalling between the wireless terminal and the packet core network in order to allocate to the wireless terminal an IP address from said IP address space. It will be appreciated that the functional entities illustrated in FIG. 12 may in practice be implemented by respective processors and memories, or may be implementing using shared processors and memories.

Figure 13:
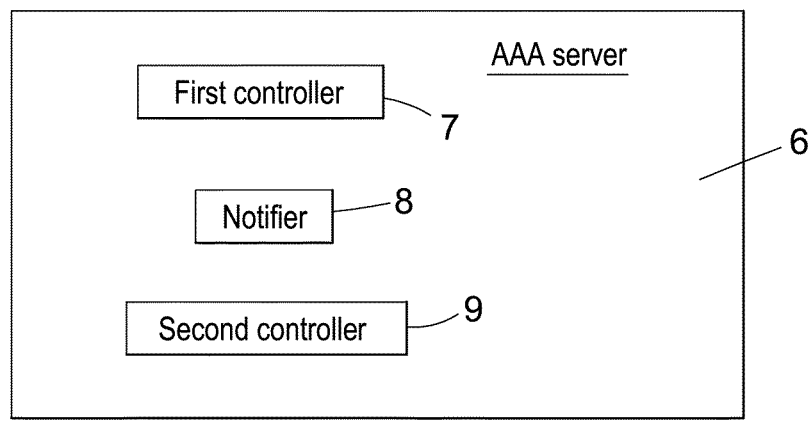
FIG. 13 illustrates schematically a AAA server suitable for use with the process of FIG. 11.

FIG. 13 illustrates schematically a AAA server 6 configured for use within a packet core network to enable the procedure discussed above. The server 6 comprises a first controller 7 for authenticating and authorizing, via a cellular radio access network, an access point (FIG. 12) that is configured to operate as a wireless hotspot for wireless terminals. The server also comprises a notifier 8 for notifying a DHCP server of the authentication and authorization of the access point and for installing in the DHCP server an IP address space of a subnet for which the access point is to act as router.

Further, and a second controller 9 is provided for authenticating and authorizing, via the access point, individual wireless terminals. It will be appreciated that the functional entities illustrated in FIG. 13 may in practice be implemented by respective processors and memories, or may be implementing using shared processors and memories.

It will be appreciated by the person of skill in the art that various modifications may be made to the above described embodiments without departing from the scope of the present invention.

The invention claimed is:

1. A method of providing access for wireless terminals to a packet core network, the method comprising:
    attaching an access point to said packet core network via a cellular radio access network, wherein the attaching includes establishing a Packet Data Network (PDN) connection between said access point and a packet gateway of said packet core network;
    defining a subnet associated with an Internet Protocol (IP) address space, and configuring said access point as a router of the subnet; and
    for each wireless terminal from a plurality of wireless terminals that require access to said packet core network via said access point,
        a) authenticating and authorizing the wireless terminal to access the packet core network via the access point,
        b) exchanging signaling between the wireless terminal and the packet core network via the access point in order to allocate to the wireless terminal an IP address from said IP address space,
        c) establishing, for the wireless terminal, a dedicated bearer associated with the PDN connection, and
        d) routing all packets between the wireless terminal and the packet core network, via the dedicated bearer established for the wireless terminal.

2. The method according to claim 1, wherein said access point is a WiFi access point and said wireless terminals communicate with the access point using WiFi protocols.

3. The method according to claim 1, wherein said cellular radio access network utilizes High Speed Packet Access (HSPA) over 3G, or Long Term Evolution (LTE).

4. The method according to claim 1, wherein authenticating and authorizing the wireless terminal to access the packet core network comprises utilizing an Authentication, Authorization, and Accounting (AAA) server in the packet core network.

5. The method according to claim 4, wherein authenticating and authorizing the wireless terminal to access the packet core network comprises using Extensible Authentication Protocol (EAP) Subscriber Identity Module (SIM)/Authentication and Key Agreement (AKA) or another EAP-based protocol.

6. The method according to claim 5, wherein authenticating and authorizing the wireless terminal to access the packet core network comprises an 802.1x exchange between the wireless terminal and the access point, and a radius/EAP exchange between the access point and the AAA server.

7. The method according to claim 1, wherein exchanging signaling between the wireless terminal and the packet core network via the access point comprises an exchange of Dynamic Host Control Protocol (DHCP) signaling between the wireless terminal and the access point, and between the access point and a DHCP function in the packet core network.

8. The method according to claim 1, further comprising:
    following authentication of a wireless terminal, establishing a dedicated PDN connection for the respective authenticated wireless terminal, between the access point and the packet core network, establishing one or more dedicated bearers associated with that dedicated PDN connection, and routing all packets between the respective authenticated wireless terminal and the packet core network, via said dedicated bearer(s).

9. The method according to claim 1, further comprising:
    installing, for each authorized wireless terminal, policies in a packet gateway of the packet core network, policies being applied to downlink packets based upon the allocated IP addresses.

10. The method according to claim 1, further comprising:
    installing, for each authorized wireless terminal, policies in said access point, policies being applied to uplink packets based upon the allocated IP addresses.

11. The method according to claim 4, further comprising:
    installing, for each authorized wireless terminal, policies in a packet gateway of the packet core network, policies being applied to downlink packets based upon the allocated IP addresses, wherein installing a policy is triggered by the AAA server signaling to a Policy Charging Rules Function (PCRF), which in turn installs the policy in the packet gateway and/or access point.

12. An access point for enabling wireless terminals to access a packet core network, the access point comprising:
    a cellular radio controller, configured to attach to a packet core network via a cellular radio access network, wherein the attachment to the packet core network establishes a default Packet Data Network (PDN) connection between the access point and a packet gateway of the packet core network;
    an Internet Protocol (IP) router, configured to operate as an access router for a subnet associated with an IP address space, wherein the access router is configured to route packets between the wireless terminals and the packet core network via respective dedicated bearers established for each of the wireless terminals, wherein each of the respective dedicated bearers is associated with the default PDN connection;
    a local radio controller, configured to provide a wireless hotspot for wireless terminals within a local coverage area; and
    a signaling relay, configured to relay authentication signaling between a wireless terminal and the packet core network, and to relay further signaling between the wireless terminal and the packet core network in order to allocate to the wireless terminal an IP address from said IP address space.

13. The access point according to claim 12, wherein said local radio controller is configured to provide a WiFi hotspot.

14. The access point according to claim 12, wherein the access point is a Fixed Wireless Terminal, and wherein said cellular radio controller is configured to interoperate with said cellular radio access network using High Speed Packet Access (HSPA) over 3G, or Long Term Evolution (LTE) communication protocols.

15. The access point according to claim 12, wherein said signaling relay is configured to employ an 802.1x exchange with the wireless terminal and a radius/Extensible Authentication Protocol (EAP) exchange with an Authentication, Authorization, and Accounting (AAA) server within the packet core network.

16. The access point according to claim 12, wherein said access router is configured to route packets between the wireless terminals and the packet core network via respective dedicated bearers associated with respective Packet Data Network (PDN) connections, established over the cellular radio access network.

17. An Authentication, Authorization, and Accounting (AAA) server for use within a packet core network, the AAA server comprising:
a first controller, configured to authenticate and authorize, via a cellular radio access network, an access point that is configured to operate as a wireless hotspot for wireless terminals;
a notifier, configured to notify a Dynamic Host Control Protocol (DHCP) server of the authentication and authorization of the access point, and to install in the DHCP server an IP address space of a subnet for which the access point is to act as a router; and
a second controller, configured to authenticate and authorize, via the access point, individual wireless terminals.

18. The AAA server according to claim 17, wherein said second controller is configured to signal to a policy controller to initiate installation of uplink filters in the access point in respect of the authenticated and authorized wireless terminals.

* * * * *